US010916067B1

United States Patent
Gehlaut et al.

(10) Patent No.: US 10,916,067 B1
(45) Date of Patent: Feb. 9, 2021

(54) INTELLIGENT ALIGNMENT OF GRAPHICAL ELEMENTS

(71) Applicant: Adobe Inc., San Jose, CA (US)

(72) Inventors: Tarun Gehlaut, Haryana (IN); Prateek Soni, Rajasthan (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/683,840

(22) Filed: Nov. 14, 2019

(51) Int. Cl.
*G06T 19/20* (2011.01)
*G06K 9/62* (2006.01)

(52) U.S. Cl.
CPC ............ *G06T 19/20* (2013.01); *G06K 9/6202* (2013.01); *G06K 9/6223* (2013.01); *G06K 9/6265* (2013.01)

(58) Field of Classification Search
CPC .... G06T 19/20; G06K 9/6202; G06K 9/6223; G06K 9/6265
USPC .......................................................... 345/619
See application file for complete search history.

(56) References Cited

U.S. PATENT DOCUMENTS

| 10,380,769 | B1 | 8/2019 | Beri et al. | |
|---|---|---|---|---|
| 2006/0150092 | A1* | 7/2006 | Atkins | G06T 11/60 715/251 |
| 2012/0026100 | A1* | 2/2012 | Migos | G06F 3/04883 345/173 |
| 2018/0004401 | A1* | 1/2018 | Travis | G06F 3/0489 |

OTHER PUBLICATIONS

Adobe "Move, Align, and Distribute Objects", https://helpx.adobe.com/illustrator/using/moving-aligning-distributing-objects.html, Feb. 15, 2017, accessed May 10, 2020, 12 pages.
Adobe "Move, Align, Distribute, and Arrange Objects", https://helpx.adobe.com/xd/help/move-align-distribute-objects.html, May 15, 2019, accessed May 10, 2020, 9 pages.
Adobe, "Align Elements in Your Design", https://helpx.adobe.com/photoshop/how-to/photoshop-align-images-multiple-layers.html, May 9, 2018, accessed May 10, 2020, 6 pages.
Adobe Illustrator "How Can I Improve Illustrator? Vote for or Share a New Idea", Oct. 27, 2017, accessed May 10, 2020, 2 pages.
Wikipedia, "K-Means Clustering", last edited May 6, 2020, access May 10, 2020, 12 pages.

(Continued)

*Primary Examiner* — Jacinta M Crawford
(74) *Attorney, Agent, or Firm* — Kilpatrick Townsend & Stockton LLP

(57) ABSTRACT

The present disclosure involves intelligent alignment of graphical elements for display within a graphical user interface. For instance, a graphics editing tool identifies position coordinates for a set of graphical elements and groups the position coordinates into one or more clusters. In some embodiments, the graphics editing tool selects the number of clusters for the clustering algorithm based on validity scores. For a given cluster, the graphics editing tool selects a centroid value of the cluster as an updated position value. The graphics editing tool aligns a subset of the graphical elements associated with the cluster by moving each graphical element to the updated position value. For instance, the graphic editing tool can change a horizontal coordinate value or a vertical component value for each graphical element to the centroid value. The graphics editing tool causes a display device to display the aligned graphical elements.

20 Claims, 11 Drawing Sheets

(56) References Cited

OTHER PUBLICATIONS

Wikipedia, "Silhouette (Clustering)", last edited May 2, 2020, access May 10, 2020, 3 pages.

Wikimedia, Office Building Illustration, https://upload.wikimedia.org/wikipedia/commons/5/59/587-office-building.svg, 2019, accessed May 10, 2020.

Scikit-Learn, "Selecting the Number of Clusters with Silhouette Analysis on Kmeans Clustering", https://scikit-learn.org/stable/auto_examples/cluster/plot_kmeans_silhouette_analysis.html , 2007-2019, accessed May 10, 2020, 4 pages.

* cited by examiner

INTELLIGENT ALIGNMENT OF GRAPHICAL ELEMENTS

TECHNICAL FIELD

This disclosure generally relates to manipulating the display of graphical elements. More specifically, but not by way of limitation, this disclosure relates to clustering images or other graphical elements for alignment within a graphical user interface.

BACKGROUND

Users of graphics editing software often seek precise alignment when manipulating graphical elements, such as images. These manipulations may take many forms, such as resizing of images, placing of images, alignment of images, and the like. The process of manipulating graphical elements is typically performed manually. For example, image editing software receives, from a user device, input identifying a set of images to be aligned, and aligns the identified images by moving at least some of these images vertically, horizontally, or both.

This manual process may provide acceptable results for cases in which the number of graphical elements to be aligned is small, such as when three or four images are to be aligned, or the graphical elements are relatively close together, such as when a horizontal axis intersects each graphical element at some location even if the horizontal axis does not intersect each graphical element at the same relative location (e.g., left edge, right edge, center). However, if a larger number of graphical elements are displayed on a page, a user may need to repeatedly select certain groups of elements for alignment, apply an alignment command, assess the results, undo unsatisfactory results, and then attempt another manual alignment.

BRIEF DESCRIPTION OF DRAWINGS

Features and embodiments of the present disclosure are better understood when the following Detailed Description is read with reference to the accompanying drawings.

BRIEF SUMMARY

Figure 1:
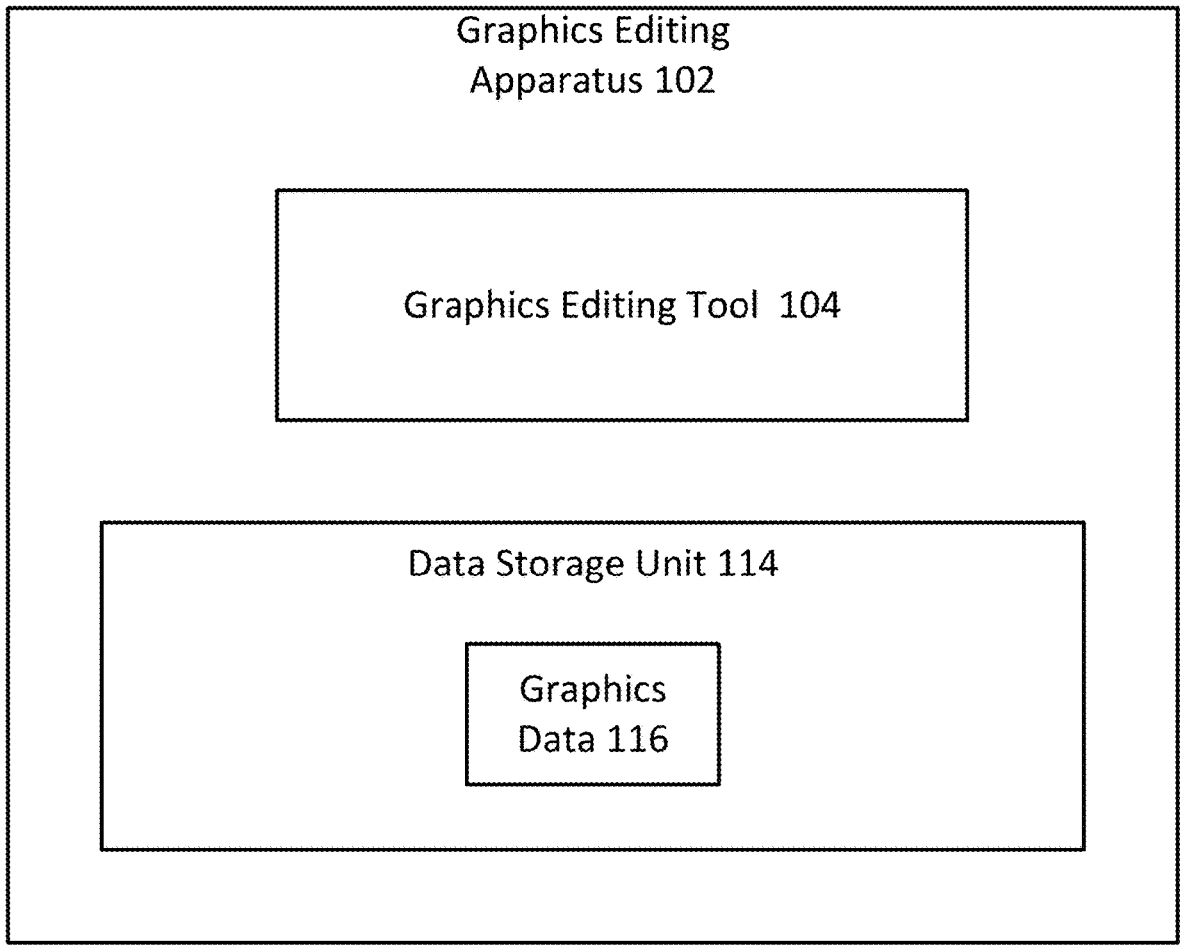
FIG. 1 illustrates an example of a graphics editing apparatus in accordance with embodiments described herein.

Certain embodiments involve clustering images or other graphical elements for alignment within a graphical user interface. For example, a graphics editing tool identifies position coordinates for a set of graphical elements. A position coordinate includes one or more of a horizontal coordinate value and a vertical component value. The graphics editing tool executes a clustering algorithm that groups the position coordinates into one or more clusters. In some embodiments, the graphics editing tool selects the number of clusters for the clustering algorithm based on validity scores, such as (but not limited to) Silhouette scores computed for points in the clusters. For a given cluster, the graphics editing tool selects a centroid value of the cluster as an updated position value. The graphics editing tool aligns a subset of the graphical elements associated with the cluster by moving each graphical element to the updated position value. For instance, the graphic editing tool can change a horizontal coordinate value or a vertical component value for each graphical element to the centroid value. The graphics editing tool causes a display device to display the aligned graphical elements.

These illustrative embodiments are mentioned not to limit or define the disclosure, but to provide examples to aid understanding thereof. Additional embodiments are discussed in the Detailed Description, and further description is provided there.

DETAILED DESCRIPTION

The present disclosure involves intelligent alignment of graphical elements for display within a graphical user interface. For instance, a graphics editing tool executes a clustering algorithm to identify groups of graphical elements and then, for each of these element groups, aligns the graphical elements within the element group. For instance, each cluster determined by the clustering algorithm represents an element group that includes graphical elements to be aligned in a given dimension (e.g., a first element group to be aligned in one column in a horizontal dimension, a second element group to be aligned in a different column in the horizontal dimension, etc.). In some embodiments, the graphics editing tool determines, prior to aligning the graphical elements, a number of clusters for the clustering algorithm based on a validity score. The validity score is an indicator of whether the clustering algorithm has determined a desirable number of clusters and, by extension, a desirable number of element groups for a given dimension. Thus, the graphics editing tool can automatically select element groups for alignment by determining a number of clusters based on validity scores. This automatic selection of element groups can reduce a trial-and-error process that might otherwise result from a user repeatedly selecting groups of graphical elements, aligning the group, undoing the alignment, and altering the groups.

The following example is used to introduce certain embodiments. In this example, a graphics editing tool accesses a set of graphical elements that are displayed in a graphical user interface. For instance, a page of a graphical presentation could include a set of graphical elements or other graphical elements. The graphics editing tool receives, from a user device, a command to align the set of graphical elements in one or more dimensions. The graphics editing tool executes a clustering algorithm on position coordinates of the graphical elements and thereby organizes the set of graphical elements into groups for alignment.

Continuing with this example, the graphics editing tool performs the clustering algorithm on position coordinates in one or more dimensions. For instance, when used to edit a two-dimensional graphical presentation, the graphics editing tool could identify a horizontal position coordinate of a graphical element, such as the i value in a pair of coordinates (i,j), or a vertical position coordinate of the graphical element, such as the j value in the pair of coordinates (i,j). The graphics editing tool executes the clustering algorithm on a set of position coordinate values, such the i values for the set of graphical elements or the j values for the set of graphical elements. The clustering algorithm assigns the graphical elements into groups. In a simplified example, the clustering algorithm assigns a first subset of the graphical elements having a first subset of the i values to a first group and assigns a second subset of the graphical elements having a second subset of the i values to a second group.

The graphics editing tool aligns the graphical elements in each element group based on a cluster of position coordinates for the graphical elements. For instance, in the example above involving two groups, the clustering algorithm determines a first cluster with the first subset of the i values and determines a second cluster with the second subset of the i values. The graphics editing tool identifies a centroid value of each cluster, and aligns the group of graphical elements based on the cluster. For instance, the graphics editing tool sets each i coordinate for the first group of graphical elements to the centroid value of the first cluster and sets each i coordinate for the second group of graphical elements to the centroid value of the second cluster. Setting each i coordinate for the first group of graphical elements to the centroid value aligns the first group of graphical elements into a first column, and setting each i coordinate for the second group of graphical elements to the centroid value aligns the second group of graphical elements into a second column. The graphics editing tool can generate, for display on a display device, an updated graphical user interface that depicts the aligned graphical elements.

Although the example above involves aligning graphical elements into a column by modifying horizontal coordinate values, the graphics editing tool can perform a similar process in each dimension of a graphical presentation. For example, the graphics editing tool aligns graphical elements within columns of a grid by applying the clustering algorithm to horizontal coordinate values and aligns the graphical elements within rows of the grid by applying the clustering algorithm to vertical coordinate values. Similarly, if the graphics editing tool is used to edit a three-dimensional graphic, the graphics editing tool can cluster coordinate values in each dimension and align, based on the clusters, graphical elements associated with the coordinate values.

In the examples described above, the number of clusters used by a clustering algorithm influences how many groups of graphical elements are identified and, by extension, the number of rows graphical elements or columns of graphical elements that result from the alignment process. In some embodiments, the graphics editing tool computes one or more validity scores that allow the graphics editing tool to select a number of clusters for the clustering and alignment process described above. A validity score is a metric that indicates whether a number of clusters used by the clustering algorithm is too large or too small.

The following example illustrates the graphics editing tool's use of validity scores. In this example, prior to aligning a set of graphical elements, the graphics editing tool performs multiple iterations of the clustering algorithm described above. Each iteration of the clustering algorithm groups a set of coordinate values into a different number of clusters (e.g., a first iteration groups ten i values into two clusters, a second iteration groups ten i values into three clusters, etc.). The graphics editing tool computes a validity score for each iteration and selects the iteration of the clustering algorithm having the highest validity score for aligning a set of graphical elements.

An example of the validity score is a Silhouette score, which is a measure of proximity between a point in a given group (e.g., a centroid of a cluster) and points in nearby groups (e.g., centroids of neighboring clusters). For instance, a higher Silhouette score for a particular point in a cluster could indicate that the particular point is further away from points in a neighboring cluster, and a lower Silhouette score for a particular point in a cluster could indicate that the particular point is closer to points in a neighboring cluster. In some embodiments, the graphics editing tool computes a validity score for a particular number of clusters of the clustering algorithm by averaging the Silhouette scores for a set of points (e.g., centroids) from respective clusters determined by the clustering algorithm. For instance, if the graphics editing tool determines that an iteration of the clustering algorithm that outputs three clusters has the highest average Silhouette score, the graphics editing tool aligns three groups of graphical elements based on their respective clusters (e.g., by setting a coordinate value for a group of graphical elements to the centroid value for the group's cluster of coordinate values).

Embodiments described herein provide improvements over existing software tools for editing digital content. For instance, existing software tools require users to manually select a group of graphical elements for a given alignment operation (e.g., clicking on three objects and activating an "align" command). As the number of graphical elements displayed on a page increases, a user may need to perform a tedious, trial-and-error process in order to align the graphical elements in a visually appealing manner. For instance, if fifteen graphical elements are displayed on a page, a user may select and align three groups of five objects into three columns, decide that the alignment leaves too much white space on the page, undo one or more of the alignment operations, and then select and align different groups of objects into a different number of columns.

By contrast, embodiments described herein use mathematical-based clustering algorithms (e.g., clustering algorithms described below with respect to FIGS. 3 and 4, cluster validation algorithms described below with respect to FIGS. 5 and 6, etc.) to determine numbers of rows and columns for a set of graphical elements, rather than relying solely on subjective user judgments with respect to the selection of element groups for alignment. For instance, a graphics editing tool can utilize a clustering algorithm described in the examples above to automatically determine a number of element groups for a certain dimension (e.g., an x axis, a y axis, etc.) and align the objects in each element group. If the graphics editing tool uses validity scores along with the clustering algorithm to determine the number of element groups, the resultant groups of aligned objects can be positioned on a page in a mathematically determined manner that is more likely to be visually appealing to the user. Even if a user further refines the positions of the objects, such as by moving a single graphical element from one automatically determined column to a different automatically determined column, the time and effort involved in aligning the set of graphical elements on a page can be reduced by initially using the graphics editing tool to perform an automatic alignment. Thus, certain techniques described herein improve the operation of software tools used to edit digital content. For instance, these techniques can reduce the manual effort associated with alignment of graphical elements when using conventional tools and instead provide an automated alignment of graphical elements based on objective criteria, such as the clusters that are determined by the clustering algorithm and a number of cluster that is identified using validity scores.

FIG. 1 illustrates an example of a graphics editing apparatus 102. Graphics editing apparatus 102 includes one or more processing devices for executing a graphics editing tool 104. Graphics editing tool 104 includes one or more modules that perform intelligent multi-dimensional alignment of a visual medium. A visual medium may include any digital visual art, including, but not limited to, a digital photograph, a video, a video with or without audio, a digital graphical element, digital drawings, and the like. The digital visual can be three-dimensional or two-dimensional. A visual medium may be in any suitable format that is capable of being rendered on a display. Examples of formats of visual mediums may include Joint Photographic Experts Group (JPEG), Tagged Graphical element File Format (TIFF), Portable Network Graphics (PNG), Windows Media Video (WMV), Audio Video Interleave (AVI), and the like.

Such a visual medium can be stored as graphics data 116 in a data storage unit 114. Data storage unit 114 can be implemented as a local storage medium, one or more databases or one or more data servers. In one embodiment, data storage unit 114 may be remote from graphics editing apparatus 102. In such an embodiment, data storage unit 114 may be connected to graphics editing apparatus 102 by one or more wireless connections, such as a local area network (LAN), Bluetooth, the Internet, and the like. Graphics data 116 may include one or more sets of given graphical elements that can be intelligently aligned according to embodiments described herein. In one embodiment, graphical elements stored within graphics data 116 may include stock graphical elements, graphical elements received from external devices such as a camera, graphical elements received from the Internet, and the like. In one embodiment, graphics data 116 may store an aligned configuration of a set of graphical elements. In such an embodiment, once a set of graphical elements is intelligently aligned the aligned group of graphical elements may be stored in graphics data 116. In one embodiment, a remote user device may locally or remotely access graphics data 116 to retrieve previously aligned groups of graphical elements.

Figure 2:
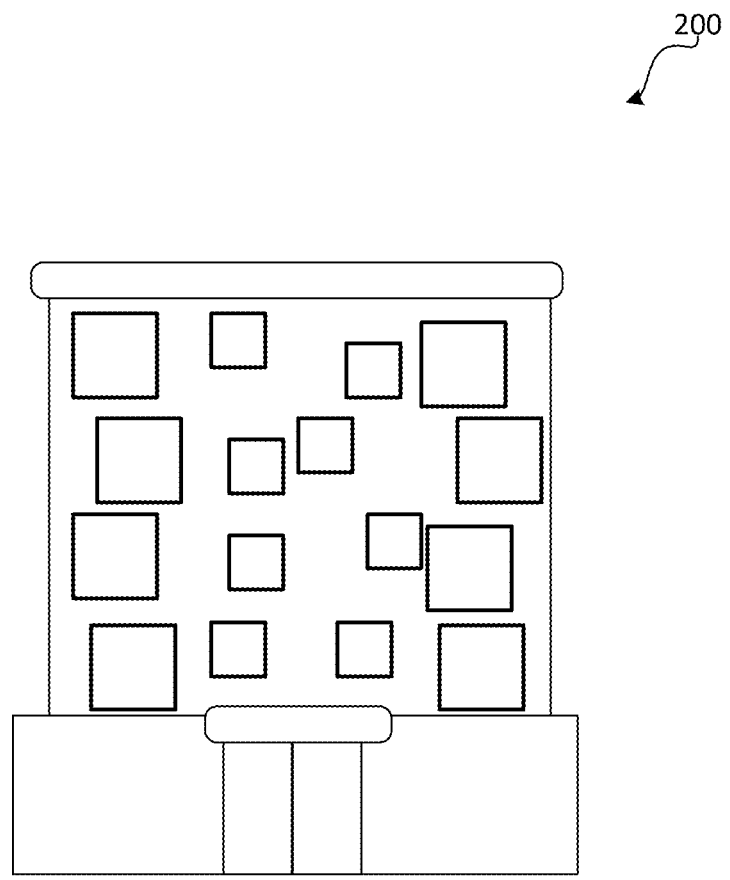
FIG. 2 illustrates an example of a set of graphical elements that can be arranged in a graphical user interface using a graphics editing apparatus, in accordance with embodiments described herein.

Graphics editing tool 104 can intelligently align a set of graphical elements. An example of such a set of graphical elements is depicted in FIG. 2. In this simplified example, GUI 200 includes a set of box-shaped graphical elements to be aligned, though other types of graphical elements (e.g., digital drawings, GIFs, videos, artwork, etc.) may be used. The set of graphical elements may be displayed in any type of visual order (e.g., randomized pattern, zigzag pattern, a single column, a single row, and the like). In one embodiment, each of the given set of graphical elements may include graphical elements of different sizes. For example, a first set of graphical elements may be 1×1 graphical elements, a second set of graphical elements may be 2×2 graphical elements, a third set of graphical elements may be 3×5, and so forth. In one embodiment, each graphical element within the given set of graphical elements has a different height and/or width). The given graphical elements in GUI 200 may be presented in any order.

GUI 200 may be displayed via any means. For instance, the GUI 200 can be displayed on a display device that is connected to graphics editing apparatus 102 via a physical connection, such as a bus, or that is remotely connected to graphics editing apparatus 102 via a wireless connection, such as a Bluetooth connection or an Internet connection.

In the example depicted in FIG. 2, the graphical elements within GUI 200 are not aligned in any particular way. Embodiments described herein describe techniques to intelligently align given graphical elements. For instance, graphics editing tool 104 could align the graphical elements from GUI 200 as a grid of graphical elements.

Returning to FIG. 1, graphics editing tool 104 includes program code that, when executed by graphics editing apparatus 102, causes graphics editing apparatus 102 to store coordinate values in one or more coordinate arrays. The coordinate arrays include coordinate values from positions of graphical elements displayed on a GUI. In particular, graphics editing tool 104 can identify a position of each graphical element as a set of coordinates (i,j). The (i,j) coordinates specify a position within a grid spanning the GUI. For example, the i coordinate may indicate a horizontal position within the grid, and the j coordinate may indicate a vertical position within the grid.

Graphics editing tool 104 identifies each set of coordinates (i,j) for a particular location in the graphical element. For instance, graphics editing tool 104 could identify, for each graphical element, a respective position (i,j) that is a bottom-left corner of the graphical element, an upper-right corner of the graphical element, etc. The particular location may be a default location or a user-specified location.

Graphics editing tool 104 can also store a set of coordinate values for a given dimension in a coordinate array. For example, graphics editing tool 104 can generate a first coordinate array for a horizontal dimension and a second coordinate array for a vertical dimension. Graphics editing tool 104 can store i coordinate values in the first coordinate array and can store j coordinate values in the second coordinate array. In examples involving three-dimensional graphics, graphics editing tool 104 can store coordinate values for a third dimension in a third coordinate array.

Graphics editing tool 104 can also include program code that, when executed by graphics editing apparatus 102, causes graphics editing apparatus 102 to perform a clustering algorithm on coordinate values in the first array and to separately perform the clustering algorithm on coordinate values in the second array. Graphics editing tool 104 can determine centroids for a group of coordinate values that are generated using the clustering algorithm. Graphics editing tool 104 can use the centroids to align groups of graphical elements. For example, graphics editing tool 104 could set values of an i or j coordinate to a centroid value.

An example of the clustering algorithm is a K-means clustering algorithm, which iteratively assigns each coordinate value for a set of graphical elements into one of K groups. The iterative nature of the K-means clustering algorithm, if unconstrained with respect to the value of K, may cause the value of K to increase until each graphical element in a set of graphical elements is within its own group (i.e., K=number of graphical elements). Such a result would be inadequate for alignment purposes, since a cluster with only one value (i.e., the i or j coordinate value for only one graphical element) would always have a centroid value that is equal to that value.

To ensure that at least some of the clusters include multiple coordinate values, graphics editing tool 104 also computes a set of validity scores. Graphics editing tool 104 uses these validity scores to identify a number of clusters K to be used when aligning graphical elements in a given dimension. For example, graphics editing tool 104 could compute a value of K such that 2<K<N−1, where N is the number of graphical elements in a given set of graphical elements. Examples of computing validity scores are described herein with respect to FIGS. 5 and 6.

Graphics editing tool 104 may also include program code that, when executed by graphics editing apparatus 102, causes graphics editing apparatus 102 to perform a cluster validation algorithm. The cluster validation algorithm computes validity scores for clusters determined by a clustering algorithm executed by graphics editing tool 104. An example of the cluster validation algorithm is a Silhouette score algorithm, which computes a Silhouette score that can be used as the validity score. The Silhouette score is a measure of proximity between a point in a given group (e.g., a centroid of a cluster) and points in nearby groups (e.g., centroids of neighboring clusters). Graphics editing tool 104 can use this measure of proximity as a metric for comparing different numbers of clusters identified by a K-means clustering algorithm or other suitable clustering algorithm.

For example, graphics editing tool 104 provides outputs of the clustering algorithm, such as data identifying a number of clusters, as inputs to the cluster validation algorithm. The cluster validation algorithm generates a validity array having validity scores. For instance, if the clustering algorithm is performed on the i coordinate values and separately performed on the j coordinate values, the cluster validation algorithm outputs two validity arrays, one for the i coordinate values and one for the j coordinate values. Graphics editing tool 104 determines, from a validity array, how many clusters are to be used in each dimension (e.g., how many rows of graphical elements are to be used for the vertical dimension and how many columns of graphical elements are to be used for the horizontal dimension). For instance, graphics editing tool 104 selects a maximum value (i.e., a maximum validity score) from a validity array and uses the number of clusters that resulted in that maximum value as the number of element groups for alignment in a given dimension. In one example, if the validity array for a set of i coordinate values includes [0, 0.5, 0.75, 0.6, 0.5, 0.4, 0.3, 0], then graphics editing tool 104 determines that K=3 (i.e., the number of cluster resulting in the 0.75 value) should be used for the clustering of i coordinate values (i.e., that three groups of graphical elements should be grouped into three columns). Similarly, if the validity array for a set of j coordinate values includes [0, 0.1, 0.2, 0.3, 0.4, 0.2, 0.1, 0], then graphics editing tool 104 determines that K=5 (i.e., the number of clusters resulting in the 0.4 value) should be used for the clustering of j coordinate values (i.e., that graphical elements should be grouped into five rows).

In some embodiments, graphics editing tool 104 also includes program code that, when executed by graphics editing apparatus 102, causes graphics editing apparatus 102 to determine and apply spacing between graphical elements. For instance, as discussed above, graphics editing tool 104, by performing the clustering algorithm, could determine a number of rows and columns of a grid and position each graphical element in a different grid-cell of the grid. However, positioning a set of graphical elements in such a grid may not provide consistent spacing between pairs of the graphical elements. This lack of consistent spacing may result, at least in part, from different graphical elements in the set having different sizes (i.e., height and/or width).

To address this issue, graphics editing tool 104 can also include program code that, when executed, can determine and set a size of each grid-cell in the grid applied to a GUI. A given grid-cell contains one graphical element of the given graphical element set. The heights and widths of grid-cells control the horizontal and vertical spacing of a set of graphical elements. In one embodiment, graphics editing tool 104 generates a uniform grid. In such a uniform grid, each grid-cell may have a width that is the maximum width for all graphical elements in the given graphical element set and a height that is the maximum width for all graphical elements in the given graphical element set.

For instance, graphics editing tool 104 generates such a uniform grid by computing horizontal and vertical spacing values, where each pair of grid-cells has the computed horizontal spacing and vertical spacing. In one example, graphics editing tool 104 couldusethe formula n*maxCellWidth+n−1)*horizontalSpacing=maxRowWidth to compute a horizontal spacing horizontalSpacing and the formula m*maxCellHeight+(m−1)*verticalSpacing=maxColumnHeight to compute a vertical spacing verticalSpacing. The variables horizontalSpacing and verticalSpacing may be referred to as spacing variables.

In this example, the term n represents the number of columns in a grid (i.e., the number of element groups along a horizontal dimension), the term maxCellWidth represents the width of the grid-cell having a graphical element with the largest width, and the term maxRowWidth represents the width of the widest row in the grid. Graphics editing tool 104 determines the value of maxCellWidth by, for example, identifying the widths of graphical elements to be aligned and selecting the maximum value of these identified widths.

Graphics editing tool 104 determines the maxRowWidth by determining the maximum distance to be occupied by the aligned set of graphical element along a horizontal dimension. One example of this maximum distance is a maximum distance between the outermost horizontal edges of two graphical elements in a row. For instance, the clustering algorithm described above assigns different graphical elements to different rows. For each row, graphics editing tool 104 can identify the smallest horizontal coordinate value associated with the group of graphical elements assigned to the row (e.g., the horizontal coordinate value of the left edge of the leftmost graphical element) and the largest horizontal coordinate value associated with the group of graphical elements assigned to the row (e.g., the horizontal coordinate value of the right edge of the rightmost graphical element). Graphics editing tool 104 could set maxRowWidth to the difference between the largest horizontal coordinate value and the smallest horizontal coordinate value.

Another example of this maximum distance is a distance between the two graphical elements, from an entire set of graphical elements to be aligned, that are positioned the furthest apart in the horizontal dimension. For instance, graphics editing tool 104 could identify the smallest horizontal coordinate value associated with the set of graphical elements (e.g., the horizontal coordinate value of the left edge of the leftmost graphical element) and the largest horizontal coordinate value associated with the set of graphical elements (e.g., the horizontal coordinate value of the right edge of the rightmost graphical element). Graphics editing tool 104 could set maxRowWidth to the difference between the largest horizontal coordinate value and the smallest horizontal coordinate value.

Other values of maxRowWidth could also be used. For instance, the value of maxRowWidth could be a user-specified portion of an artboard in which a set of graphical elements is to be aligned, such as the difference between a pair of horizontal coordinate values identified via user input. In another example, the value of maxRowWidth could be a width of an artboard (e.g., a page of a document) in which a set of graphical elements is to be aligned.

Continuing with this example, the term m represents the number of rows in the grid (i.e., the number of element groups along a vertical dimension), the term maxCellHeight represents the height of the grid-cell having a graphical element with the largest height, and the term maxColumnHeight represents the height of the tallest column in the grid. Graphics editing tool 104 determines the value of maxCellHeight by, for example, identifying the heights of graphical elements to be aligned and selecting the maximum value of these identified heights. Graphics editing tool 104 determines the maxColumnHeight by determining the maximum distance to be occupied by the aligned set of graphical elements along a vertical dimension. Similar to the maxRowWidth discussed above, examples this maximum distance include the largest distance between the outermost vertical edges of two graphical elements in a column, the distance between the two graphical elements from the entire set that are positioned the furthest apart in the vertical dimension, a difference between a pair of vertical coordinate values identified via user input, and a height of an artboard (e.g., a page of a document) in which a set of graphical elements is to be aligned.

For illustrative purposes, the example above is described using two dimensions. But other implementations are possible. In cases involving a three-dimensional graphic, a spacing variable depthSpacing could identify a spacing in a third dimension, and graphics editing tool 104 could use a formula similar to $z*maxCellDepth+(z-1)*depthSpacing=maxLayerDepth$ to compute the spacing in a third dimension. In this example, the term z represents the number of layers (i.e., element groups) along the third dimension, the term maxCellDepth represents the depth of the grid-cell having a graphical element with the largest depth, and the term maxLayerDepth represents the maximum available depth of the grid. Graphics editing tool 104 determines the maxLayerDepth by, for example, by determining the maximum distance to be occupied by the aligned set of graphical elements along a third dimension (i.e., a "depth" dimension). Examples of this maximum distance include the largest distance between the outermost edges of two graphical elements in the third dimension, the distance between the two graphical elements from the entire set that are positioned the furthest apart in the third dimension, a difference between a pair of coordinate values in the third dimension that are identified via user input, and a depth of a three-dimensional artboard in which a set of graphical elements is to be aligned.

In the examples above, if graphics editing tool 104 computes a negative value for a spacing variable, then graphics editing tool 104 can change the computed value of that spacing variable to some fixed positive value. For instance, if maxRowWidth (e.g., the width of an artboard) is less than $n*maxCellWidth$ (i.e., the value of a maximum cell width multiplied by the number of columns), then horizontalSpacing=$(maxRowWidth-n*maxCellWidth)/(n-1)<0$. Graphics editing tool 104 can modify this computed value of horizontalSpacing to be a specified value, such as a user-provided horizontal spacing or a default horizontal spacing. The graphics editing tool can perform similar operations in one or more other dimensions (e.g., changing a negative value of verticalSpacing or depthSpacing to a specified value).

By executing the operation described above, graphics editing tool 104 computes, depending on a number of clusters indicated, a multi-dimensional alignment of a given set of graphical elements into a grid structure. Graphics editing apparatus 102 may then render, for display on an associated display, the given set of graphical elements in the aligned grid structure.

Figure 3:
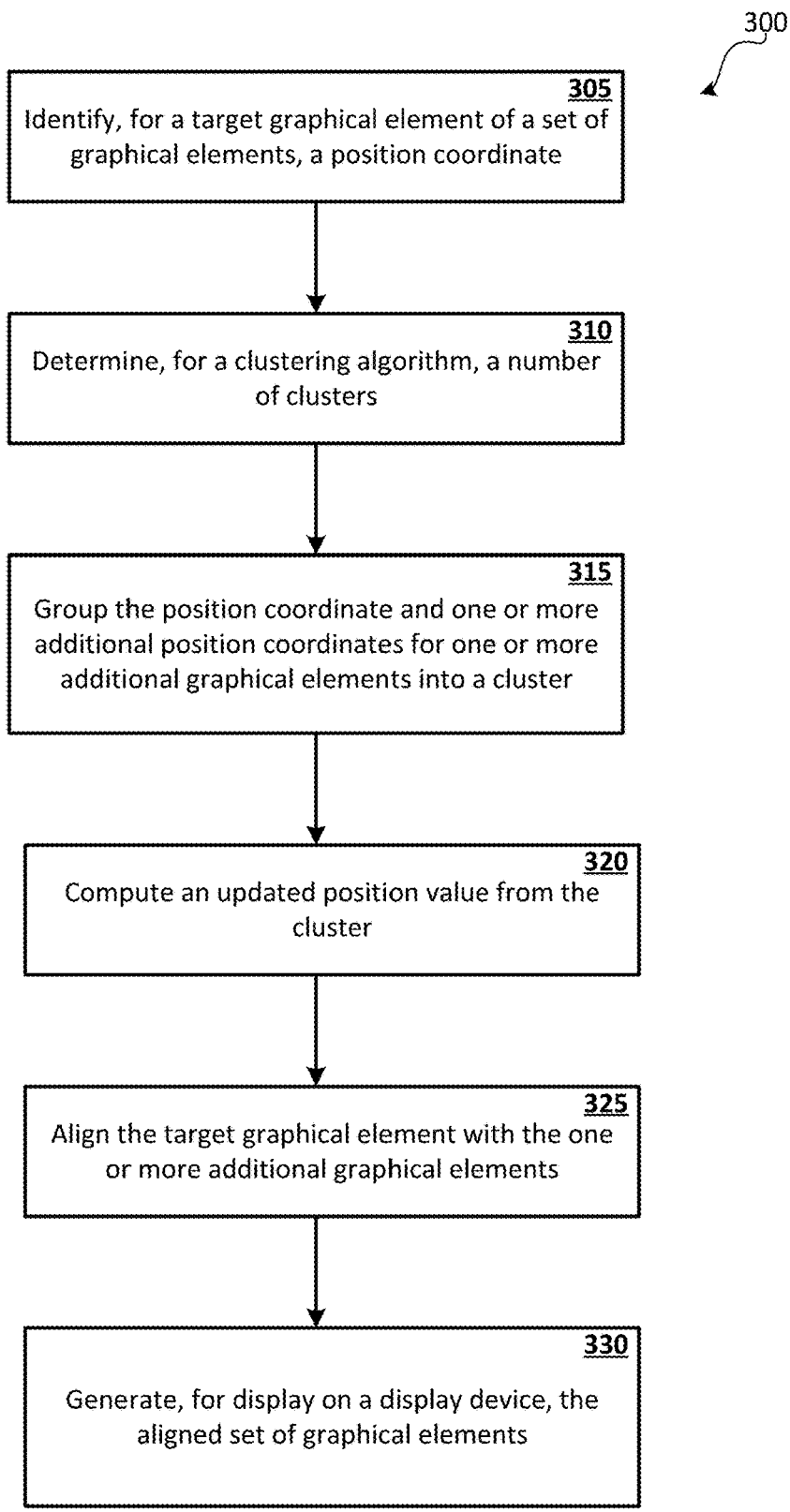
FIG. 3 illustrates an example of a process for aligning graphical elements that is performed by a graphics editing apparatus, in accordance with embodiments described herein.

FIG. 3 illustrates an example of a process 300 for intelligent graphical element alignment. A graphics editing apparatus, such as the example described above with respect to FIG. 1, can perform the process 300.

At block 305, the graphics editing apparatus identifies, for a target graphical element of a set of graphical elements, a position coordinate. The position coordinate contains a horizontal coordinate value and a vertical component value. The set of graphical elements may be displayable via a display device.

At block 310, the graphics editing apparatus determines, for a clustering algorithm, a number of clusters. In one embodiment, the clustering algorithm is a K-means clustering algorithm. The clustering algorithm may take, as inputs, the position coordinate of the target graphical element and additional position coordinates of other graphical elements in the set of graphical elements.

At block 315, the graphics editing apparatus groups the position coordinates and one or more additional position coordinates for one or more additional graphical elements into a cluster. The clustering algorithm performs this grouping function to determine a certain number of clusters. In this sense, a cluster may be a row or column of graphical elements within the set of graphical elements. In the example depicted in FIG. 3, the graphics editing apparatus assigns the target graphical element and one or more additional graphical elements to the same element group based on position coordinates for these graphical elements being in the same cluster determined by the clustering algorithm.

At block 320, the graphics editing apparatus computes an updated position value from the cluster. Each cluster formed at block 315 has a centroid value. The centroid value indicates a center point of a cluster. Each graphical element of the set of graphical elements is a member of a particular cluster and is associated with the centroid value of that particular cluster. The updated position value represents the centroid value of a cluster.

At block 325, the graphics editing apparatus aligns the target graphical element with the one or more additional graphical elements. The graphics editing apparatus performs this alignment by setting a position coordinate of the target graphical element to the updated position value and setting position coordinates of additional graphical elements in the same element group to the updated position value. For example, an element group of three graphical elements could have horizontal position coordinates [$i_1, i_2, i_3$]. The updated position value could be $i_{centroid}$, (i.e., the centroid value of a cluster of the horizontal position coordinates). The graphics editing apparatus aligns these graphical elements by setting $i_1=i_2=i_3=i_{centroid}$.

At block 330, the graphics editing apparatus generates, for display on a display device, the aligned set of graphical elements. The aligned set of graphical elements includes the target graphical element and one or more additional graphical elements that are aligned in at least one dimension.

Figure 4:
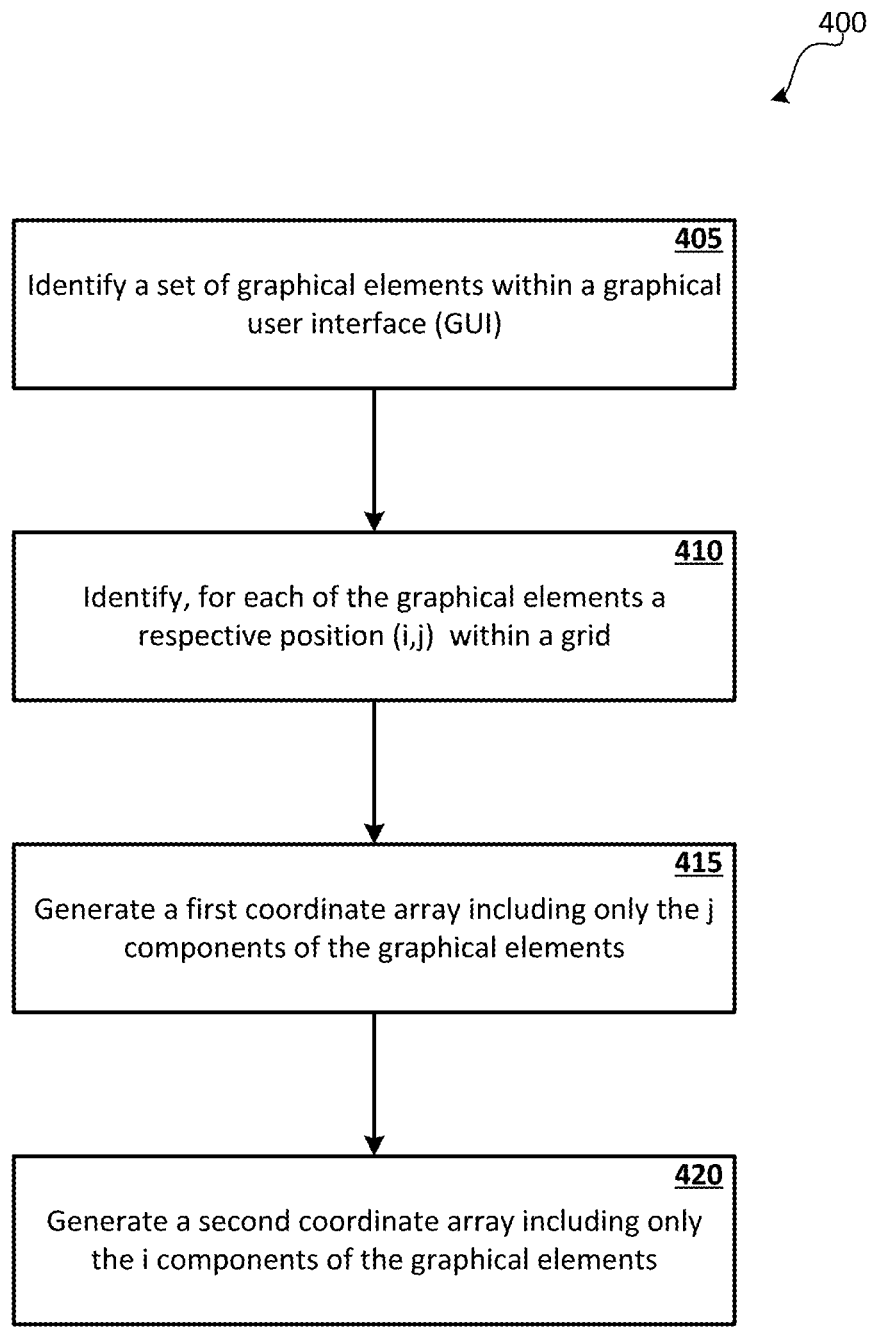
FIG. 4 illustrates an example of a process for determining and storing position coordinates of a set of graphical elements that is performed by a graphics editing apparatus in accordance with embodiments described herein.

FIG. 4 illustrates an example of a process 400 for determining position coordinates of a set of graphical elements and then generating two different arrays based on the determined position coordinates. A graphics editing apparatus, such as the example described above with respect to FIG. 1, can perform the process 400.

At block 405, the graphics editing apparatus identifies a set of graphical elements within a GUI. For example, the graphics editing apparatus may identify a set of graphical elements that has been selected for display in the GUI via one or more user inputs.

At block 410, the graphics editing apparatus identifies, for each of the graphical elements, a respective position (i,j) within a grid. To determine the relative positioning of each graphical element, the graphics editing apparatus uses a grid that spans the GUI. The grid may begin at the left corner of the GUI and extend horizontally (i.e., in the i direction) and vertically (i.e., in the j direction). The position (i,j) includes a horizontal component (i.e., i component) and a vertical component (i.e., j component). The position (i,j) of each graphical element is the graphical element's location with respect to the grid. The assigned position (i,j) is universal to each graphical element within the graphical elements. For example, if the assigned position (i,j) designates a center point in a graphical element, then the position (i,j) for each of the graphical elements will be the center point of that graphical element.

At block 415, the graphics editing apparatus generates a first coordinate array including only the j components of the graphical elements. The first array is a one dimensional array containing the vertical coordinate values (i.e., the j coordinate values) of each of the graphical elements.

Similarly, at block 420, the graphics editing apparatus generates a second coordinate array including only the i components of the graphical elements. The second array is a one dimensional array containing only the horizontal components of the position (i,j) of each of the graphical elements. By generating two different coordinate arrays, graphics editing apparatus can perform clustering based on a horizontal and vertical coordinate independently.

Figure 5:
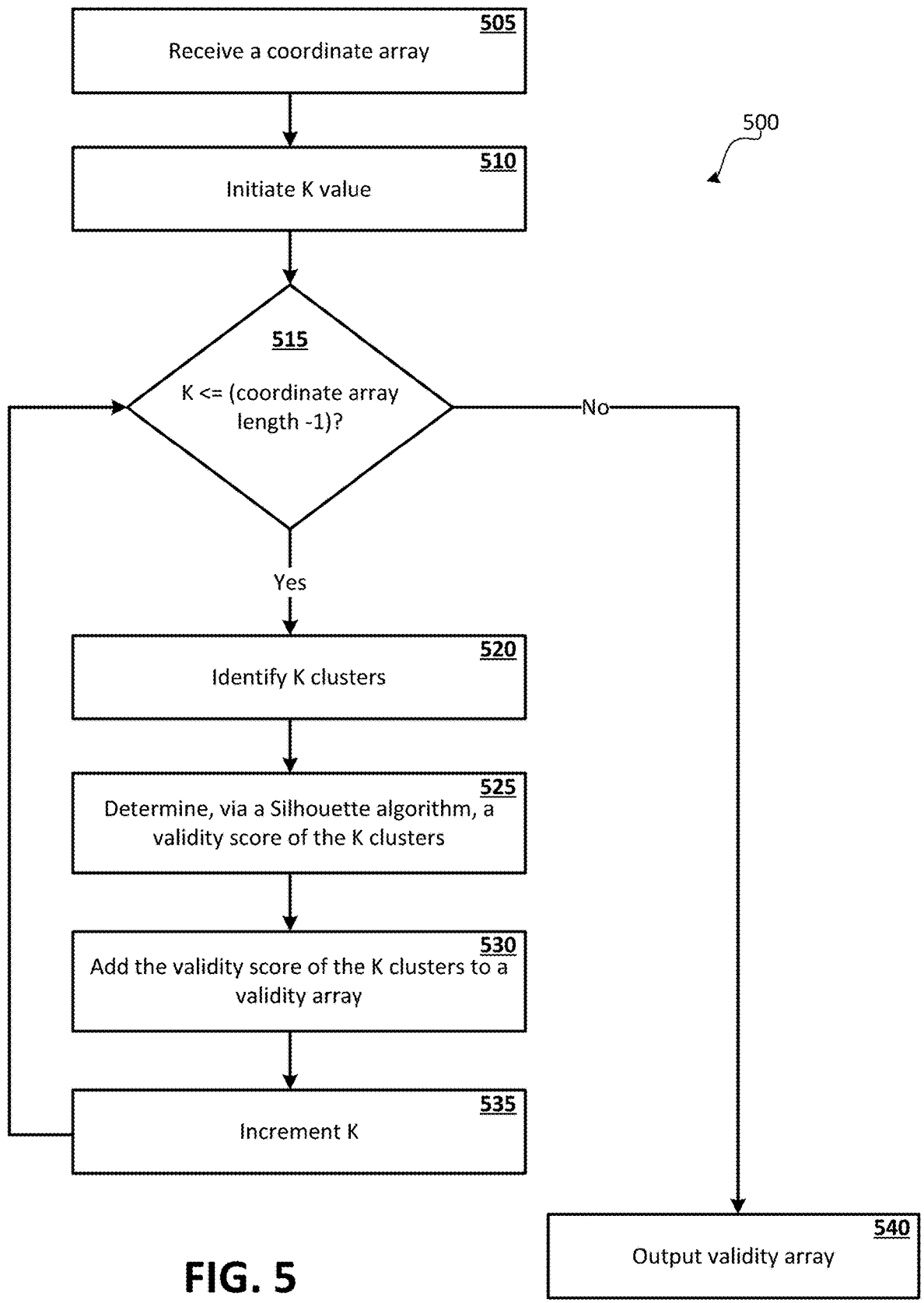
FIG. 5 illustrates an example of a process for computing validity scores used in alignment of graphical elements in accordance with embodiments described herein.

FIG. 5 illustrates an example of a process 500 for computing a validity array based on a coordinate array. A graphics editing apparatus, such as the example described above with respect to FIG. 1, can perform the process 500.

At block 505, the graphics editing apparatus receives a coordinate array having a set of coordinate values from a dimension of a GUI's grid. For example, a graphics editing tool 104 could generate a coordinate array of i coordinate values for graphical elements in the GUI, a coordinate array of j coordinate values for graphical elements in the GUI, or both.

At block 510, the graphics editing apparatus initiates a K value of a K-means clustering algorithm. In the example of FIG. 5, the initial value of K is 2, though other initial values less than a coordinate array length could be used. The coordinate array will generally have a length equivalent to the number of graphical elements whose coordinate values are stored in the coordinate array. For example, a coordinate array having eight entries is generated for a set of eight graphical elements. It should be noted that although process 500 is described as sequentially calculating values based on different values of K, it is within the scope of embodiments described herein to calculate values based on different values of K in parallel, which may increase the speed of one or more computer systems performing process 500.

At block 515, the graphics editing apparatus compares the K value to the coordinate array length minus 1. The coordinate array length minus 1 (i.e., one less than the number of graphical elements in the GUI) is the maximum value of K ensuring that at least one cluster from the K-means clustering algorithm has more than one point assigned to it. If the K value is less than or equal to the coordinate array length minus 1, then the process 500 continues to block 520. Otherwise, the process proceeds to block 540.

At block 520, the graphics editing apparatus identifies K clusters via an execution of the K-means clustering algorithm. For a value of K, the K-means clustering algorithm will group the values within the coordinate array into K groups. The K-means clustering algorithm also computes a centroid value for each of K groups. For example, if K=2, the K-means clustering algorithm will output two groups of data points, where each group has a centroid value computed from the coordinate values in the group.

At block 525, the graphics editing apparatus determines, via a Silhouette algorithm, a validity score of the K clusters.

At block 530, the graphics editing apparatus adds the validity score of the K clusters to a validity array. The validity array may be a one-dimensional array that indicates a validity score associated with each K value. The graphics editing apparatus uses values within the validity array to compute a number of clusters to be used in the K-means clustering algorithm.

At block 535, the graphics editing apparatus increments the K value and returns to block 515. Thus, blocks 520-535 of process 500 repeat for different K values until the K value matches the coordinate array length in the comparison at block 515.

At block 540, the graphics editing apparatus outputs the validity array. For example, if a received coordinate array has a length of 8, then the validity array will have 6 entries, a first entry for K=2, a second entry for K=3, a third entry for K=4, a fourth entry for K=5, a fifth entry for K=6, and a sixth entry for K=7.

Although process 500 has been described with respects to a single coordinate array, process 500 can be used to generate multiple validity arrays for multiple dimensions. The graphics editing apparatus computes a first validity array for the horizontal coordinate values of the graphical elements, and a second validity array is computed for the vertical coordinate values of the graphical elements. For example, the graphics editing apparatus may input a first coordinate array with i values into process 500 to generate a first validity array. The graphics editing apparatus may also input a first coordinate array with j values into process 500 to generate a second validity array. By having a validity array based on each individual component of a position (i, j), the graphics editing apparatus determines, for example, how many rows and columns should be included in a grid structure when using the grid structure to align a set of graphical elements.

The example of a process 500 describes above uses two different algorithms, i.e., a K-means clustering algorithm and a Silhouette algorithm. However, it is within the scope of this disclosure to use equivalent algorithms. For example, instead of using a K-means clustering algorithm an alternative clustering algorithm may be used such as DBScan, spectral clustering, modeling with Gaussian mixtures, principal component analysis, and the like. Similarly, other cluster validation algorithms may be used instead of the Silhouette algorithm. For example, a cross-validation algorithm, information criteria algorithm, an algorithm based on the information theoretic jump method, a G-means clustering algorithm, and the like.

Figure 6:
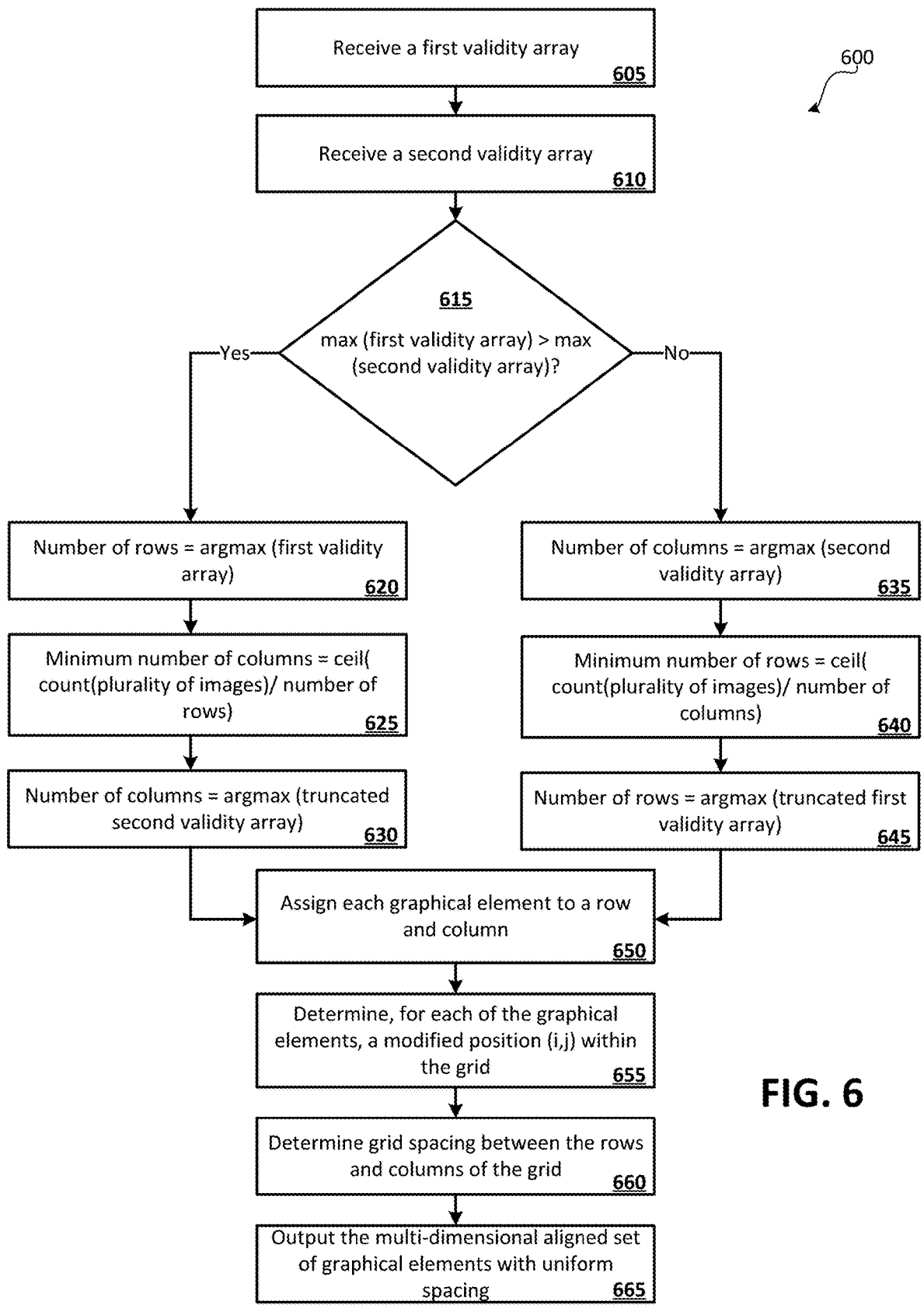
FIG. 6 illustrates another example of a process for aligning graphical elements that is performed by a graphics editing apparatus, in accordance with embodiments described herein.

FIG. 6 illustrates an example of a process 600 for determining a number of rows and columns, assigning each graphical element in a set of graphical elements to one of the rows and/or columns, and applying spacing criteria between the rows and columns in order to produce a grid structure. A graphics editing apparatus, such as the example described above with respect to FIG. 1, can perform the process 600.

At block 605, the graphics editing apparatus receives a first validity array. The first validity array may include validity scores associated with a vertical coordinate of a set of graphical elements. In one embodiment, the graphics editing apparatus generates the first validity array by performing one or more operations from processes 400 and 500.

At block 610, the graphics editing apparatus receives a second validity array. The second validity array may include validity scores associated with a horizontal component of a set of graphical elements. In one embodiment, the graphics editing apparatus generates the second validity array by performing one or more operations from processes 400 and 500.

At block 615, the graphics editing apparatus compares the maximum validity score within the first validity array to the maximum validity score within the second validity array. If the maximum validity score within the first validity array is greater than the maximum score in the second validity array, then process 600 moves to block 620. Otherwise, process 600 moves to block 635.

At block 620, the graphics editing apparatus sets the number of rows for the grid to a number that corresponds to maximum value within the first validity array. As discussed above with respect to processes 400 and 500, each validity array contains validity scores associated with different K values. Thus, the maximum value within the first validity array corresponds to a particular K value. This K value will be the number of rows in a grid for a GUI.

At block 625, the graphics editing apparatus determines the minimum number of columns to the number of graphical elements divided by the number of rows from block 620. For example, if the number of graphical elements is 9 and the number of rows is 3, then the graphics editing apparatus determines that the minimum number of columns for the grid is 3.

At block 630, the graphics editing apparatus sets the number of columns for the grid to a number that corresponds to the maximum value within a truncated second validity array. To generate the truncated second validity array, the graphics editing apparatus applies a minimum number of columns, which is determined at block 625, to the second validity array, and truncates the second validity array to include values greater than the minimum number of columns. For example, if the second validity array includes of the values [0, 1, 2, 3, 4, 5, 6, 7] and the minimum number of columns is 3 then the first 2 values from the array will be cut and the truncated second validity array will include the values [2, 3, 4, 5, 6, 7]. The values of the truncated second validity array indicate validity scores for K values at a value of 3 or greater (i.e., validity scores for 3 or more columns).

A sliced array "cuts" off validities scores associated with a value of K that is less than the minimum number of columns determined at block 625. For example, if the minimum number of columns is 3 and the second validity array has 9 entries, then validity scores computed for K<3 are removed from the second validity array to generate a sliced array of validity scores. The sliced array prevents validity scores from being considered if these validity scores are less than the minimum number of columns from block 625. The graphics editing apparatus selects the maximum value from the sliced array, identifies the K value that is associated with the maximum value, and sets the number of columns to the identified K value.

Operations associated with blocks 620-630 describe a process where the number of rows is first determined and then a number of columns are determined. The reason that the number of rows are first determined is because the maximum validity score of the first validity array is higher than the maximum validity score of the second validity array, which indicates clustering according to the j-axis (e.g., a vertical axis) is stronger than clustering according to the i-axis (e.g., a horizontal axis).

If, at block 615, the maximum validity score from the second validity array is greater than the maximum validity score of from the first validity, then the number of columns is determined at block 635. At block 635, the graphics editing apparatus sets the number of columns for the grid to a number that corresponds to the maximum value within the second validity array.

At block 640, the graphics editing apparatus determines the minimum number of rows to the number of graphical elements divided by the number of columns determined at block 635.

At block 645, the graphics editing apparatus sets the number of rows for the grid to a number that corresponds to the maximum value within a truncated first validity array. Similar to block 630, a minimum number of columns determined at block 640 number may be applied to the first validity array to create the truncated first validity array. The graphics editing apparatus determines, from this sliced array, a maximum value. The graphics editing apparatus identifies a K value associated with the maximum value from the sliced array and sets the number of rows to the identified K value.

Regardless of whether blocks 620-630 are performed or blocks 635-645 are performed, a number of rows and a number of columns for the grid are determined. At block 650, the graphics editing apparatus assigns each graphical element to a row and column. In some embodiments, the graphics editing apparatus assigns a graphical element to a row or column that is closest to the graphical element.

At block 655, the graphics editing apparatus determines, for each of the graphical elements, a modified position (i,j) within the grid. As discussed above, each validity score corresponds to a K value for a given iteration in process 500. For example, at block 620, the maximum value in the first validity array corresponds to a K value from process 500. In the same example, at block 630, the maximum value in the sliced array corresponds to a K value. Each of these K values is associated with a cluster having a centroid value. As a result, each row and column is associated with a respective centroid value. The graphics editing apparatus modifies the position (i,j) of each graphical element to be equal to centroid values of a cluster of (i,j) values for the assigned column and row. By modifying the position (i,j) of each graphical element according to its assigned row and column, the graphics editing apparatus arranges a set of graphical elements into a grid structure. For example, if a column has a centroid value of i=5, each graphical element within that column will have an horizontal coordinate of 5.

In one embodiment, processes associated with blocks 650 and 655 may occur in sequential order, such that graphical elements are aligned horizontally first (i.e., aligned into rows), and then aligned vertically second (i.e., aligned into columns) or vice versa. Regardless of the sequencing of alignment, at block 660, the graphics editing apparatus determines grid spacing between the rows and columns of the grid. After the graphical elements are positioned within a grid, spacing between pairs of the graphical elements within the grid may not be uniform throughout the grid, especially given if the graphical elements have different sizes. To address this lack of uniform spacing, the graphics editing apparatus may determine a grid-cell. The grid-cell contains only one graphical element. The graphics editing apparatus applies uniform spacing among grid-cells using the following formulas, which determine the horizontal spacing and vertical spacing between adjacent pairs of grid-cells:

$$n*\text{maxGridCellWidth} + (n-1)$$
$$*\text{horizontalSpacing} = \text{maxWidthOfAnyRowInGrid}$$

$$m*\text{maxGridCellHfeight} + (m-1)$$
$$*\text{verticalSpacing} = \text{maxfHeightOfAnyColumnInGrid}$$

The graphics editing apparatus applies the horizontal spacing and vertical spacing values to the distance between each grid-cell to achieve uniform spacing between each grid-cell. At block 665, the graphics editing apparatus outputs the multi-dimensional aligned set of graphical elements with uniform spacing. The graphics editing apparatus may save this output as a graphical element file or other suitable format. In one embodiment, the graphics editing apparatus causes this output to be in a GUI.

Figure 7:
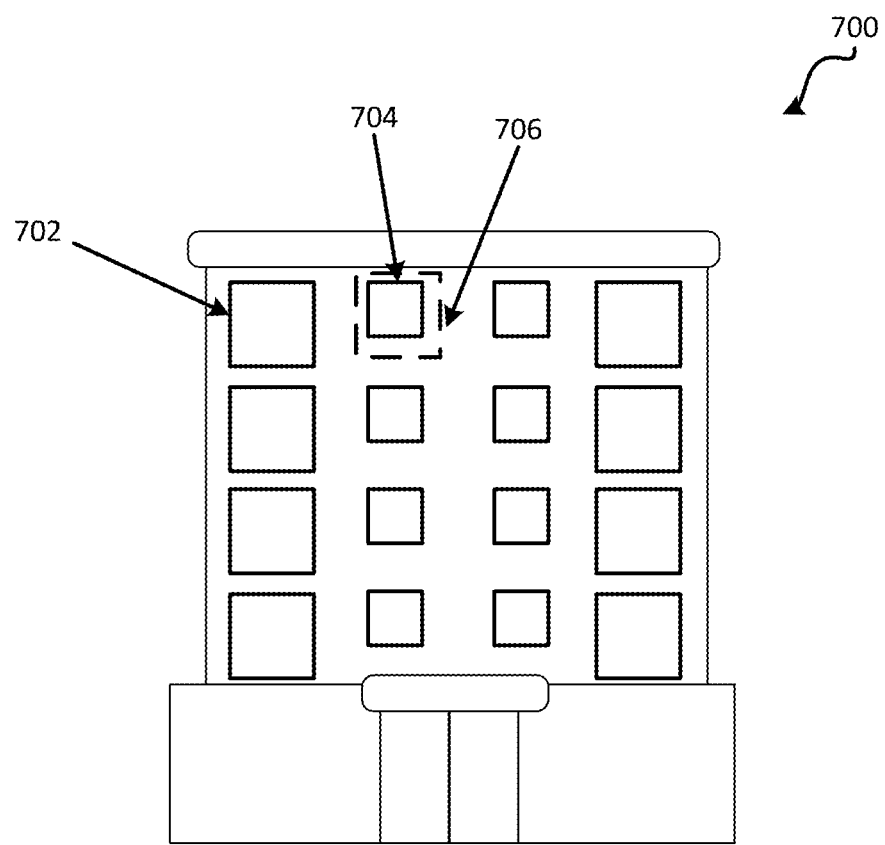
FIG. 7 illustrates an example of a graphical user interface that displays the set of graphical objects from FIG. 2 that have been aligned using one or more operations from FIGS. 3-6, in accordance with embodiments described herein.

FIG. 7 illustrates an example of a GUI 700 that displays the set of graphical elements from FIG. 2 that have been aligned in a grid. GUI 700 may be displayed by any means. As compared to GUI 200 of FIG. 2, GUI 700 depicts the set of box-shaped graphical elements in a grid with uniform spacing between grid-cells. As can be seen in GUI 700, graphical element 702 and graphical element 704 have different dimensions. Graphical element 702 has the maximum height and maximum width with respect to other graphical elements in GUI 700. Therefore, graphics editing tool 104 sets the size of grid-cell 706, which contains graphical element 704 and is indicated in FIG. 7 using a dashed line, to the height and width of graphical element 702 (i.e., the maximum grid-cell height and the maximum grid-cell width). As a result, graphics editing tool 104 applies a spacing variable value to the grid-cell 706 that contains graphical element 704, rather than applying spacing to graphical element 704 itself.

For illustrative purposes, FIG. 7 depicts the internal alignment of the graphical element 704 with the grid-cell 706 using a center-top alignment (i.e., aligning the horizontal center points and top edges of the graphical element 704 and the grid-cell 706). But other internal alignments (e.g., center-center) specified via a user input (e.g., a user-selectable property of a graphical user interface) may be used.

Figure 8:
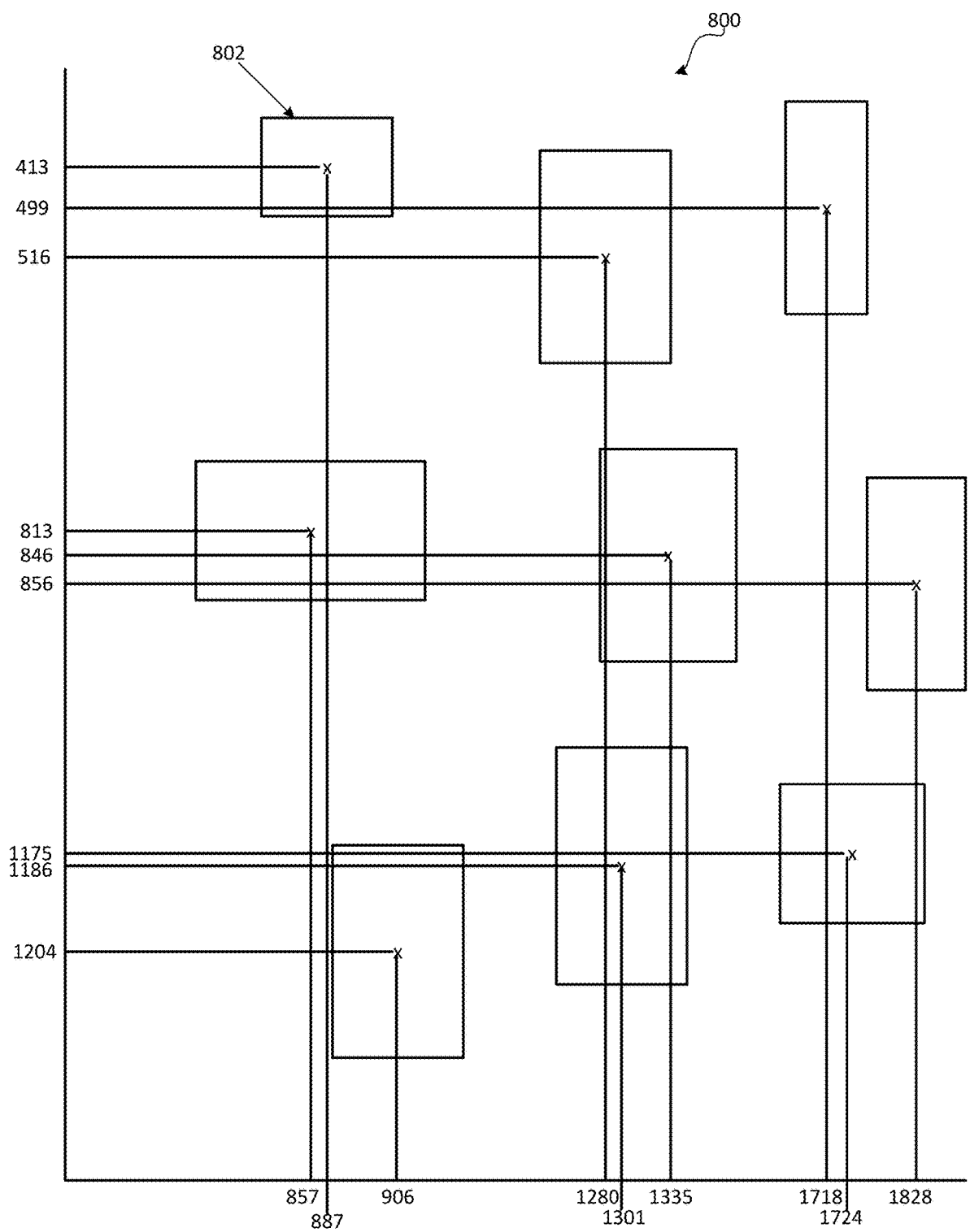
FIG. 8 illustrates an example of a graphical user interface that displays a set of graphical objects to be aligned in accordance with the application of embodiments described herein.
Figure 9:
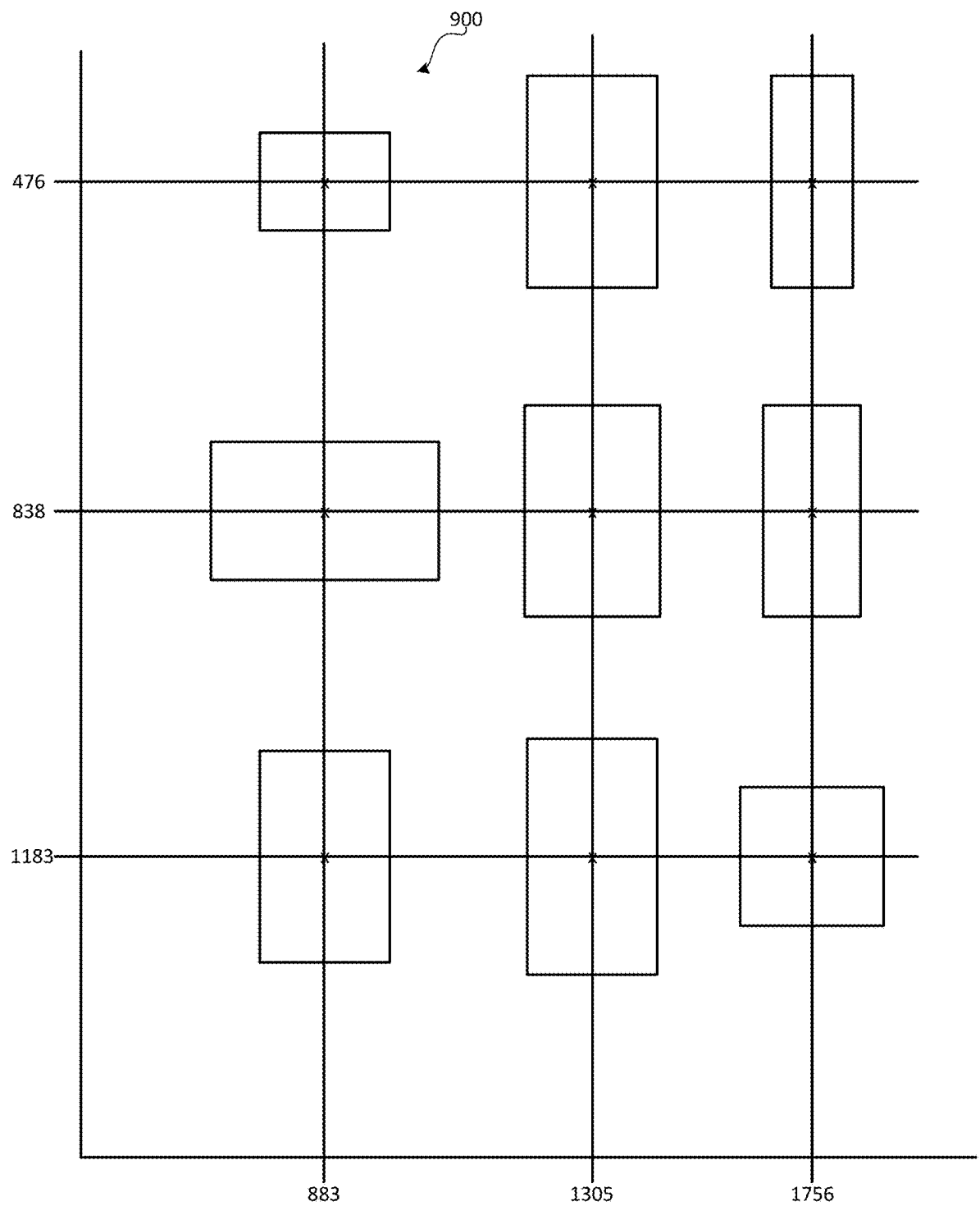
FIG. 9 illustrates an example of a graphical user interface that displays the set of graphical objects from FIG. 8 that have been aligned in accordance with the application of embodiments described herein.

FIGS. 8 and 9 collectively depict additional examples of graphical elements that can be aligned using the techniques described above. For instance, FIG. 8 illustrates a GUI 800 that displays a set of randomly placed graphical elements. A graphics editing tool 104 can align this set of graphical elements into a grid. To do so, graphics editing tool 104 determines a position (i,j) for each of the graphical elements. The position (i,j) may be any position on a graphical element, so long as the same relative position is selected for each graphical element (e.g., the center point of each graphical element, the top-left point on each graphical element, etc.). As depicted in FIG. 8, a center point for a graphical element is selected as the position (i,j). For example, the center point of graphical element 802 is at the position (887,413).

Graphics editing tool 104 generates two arrays using the determined positions (i,j) of the graphical elements. In the example depicted in FIG. 8, a first array includes vertical coordinate values [413, 499, 516, 813, 846, 856, 1175, 1186, 1204] and a second array includes horizontal coordinate values [857, 887, 906, 1280, 1301, 1335, 1718, 1724, 1828].

Next, graphics editing tool 104 performs a K-means clustering algorithm on the data points within the first array and second array separately. For each value of K, graphics editing tool 104 determines a Silhouette score. For example, graphics editing tool 104 could compute respective Silhouette coefficients for the K centroids of K clusters, where the Silhouette coefficient indicates a proximity of a cluster's centroid to points in other clusters, and computes a Silhouette score from an average of the Silhouette coefficient. The result of these two clustering algorithms is a first validity array including [0, 0.66824827, 0.88523232, 0.81248898, 0.67041805, 0.47108653, 0.27704085, 0.16163808, 0] and a second validity array including [0, 0.66278108, 0.89040219, 0.81835482, 0.62638661, 0.43427819, 0.32267641, 0.20925818, 0]. In this example, there are zeros at the start and end of each array because there are only validity scores for 2<K<8 (i.e., array length −1). The first validity array contains validity scores for vertical coordinates and the second validity array contains validity scores for horizontal components.

Because the maximum value of the second validity array (i.e., 0.89040219) is higher than the maximum value of the first validity array (i.e., 0.88523232), graphics editing tool 104 considers the clustering along the i axis to have a higher quality than the clustering along the j axis. Thus, graphics editing tool 104 determines the number of columns first. The maximum value within the second validity array corresponds to a K value of 3. As a result, graphics editing tool 104 determines that a grid for aligning the graphical elements will have three columns. Furthermore, since there are nine graphical elements displayed in GUI 800, the minimum number of rows is three (i.e., 9/3). A first validity score slice is produced including [0.88523232, 0.81248898, 0.67041805, 0.47108653, 0.27704085, 0.16163808, 0] for K values of 3, 4, 5, 6, 7, 8, and 9. The first validity score slice includes only validity scores with a K value at least equal to 3 (e.g., 3 rows or more). The maximum value of the first validity score sliced is 0.88523232, which corresponds to a K value of 3. Thus, the grid will consist of three columns and three rows.

Once the number of rows and columns are determined, the graphics editing tool assigns each graphical element to a row and a column. The graphics editing tool changes the position (i,j) of each graphical element to the centroid value for the respective row and column to which the graphical element is assigned. In addition, the graphics editing tool applies a spacing variable value, as described above, to each of the rows and columns, thereby creating uniform spacing between grid-cells associated with each graphical element.

FIG. 9 illustrates a GUI 900 that displays the graphical elements from FIG. 8 after an alignment operation has been performed. In this example, GUI depicts the graphical elements in a grid of three rows and three columns. Each graphical element in a row has the same vertical coordinates with respect to a graphical element's position (i,j). As shown in GUI 900, each center point for graphical elements in the first row has a vertical coordinate value of 476. Similarly, each center point for graphical elements in the second row has a vertical coordinate value of 838. Likewise, each center point for graphical elements in the first column has a horizontal coordinate value of 883. Thus, GUI 900 displays a given set of graphical elements intelligently aligned in a grid according to embodiments disclosed herein.

Figure 10:
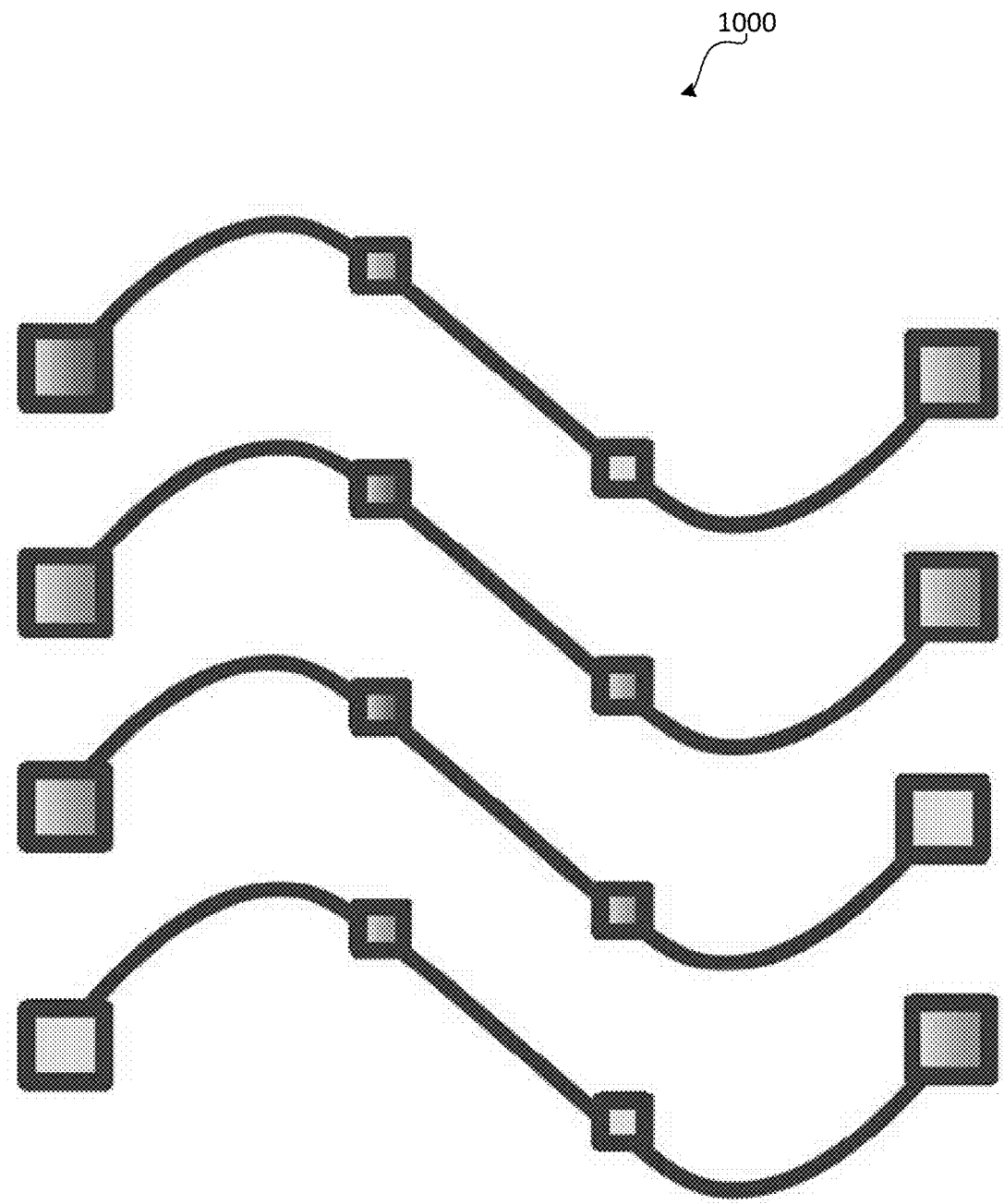
FIG. 10 illustrates an example of a graphical user interface for displaying a non-linear alignment of a set of graphical elements in accordance with embodiments described herein.

In additional or alternative embodiments, designs other than a linear horizontal and vertical alignment may be achieved. For instance, FIG. 10 illustrates a GUI 1000 for displaying a non-linear alignment of a set of graphical elements. In GUI 1000, each box is representative of a particular graphical element. In one example, a graphics editing tool arranges a set of graphical elements into a grid, as described with respect to one or more example discussed above. In some embodiments, the graphics editing tool generates a non-linear alignment by moving, responsive to a user input, one or more rows of the grid, one or more columns of the grid, or some combination thereof. For instance, to achieve the non-linear alignment in FIG. 10, a set of sixteen graphical elements are first organized into a grid of four columns and four rows, and a user can then shift the second column of graphical elements upward and the third column of graphical elements downward. In additional or alternative embodiments, the graphics editing tool generates a non-linear alignment by executing an algorithm for arranging graphical elements along one or more curved paths, where graphics editing tool 104 uses one or more spacing variables used to generate a grid (as described above) to determine distances between graphical elements along a curved path. Examples of such an algorithm for arranging graphical elements along a path can be found in U.S. Pat. No. 10,380,769, which is incorporated by reference herein.

Example of a Computing System for Implementing Certain Embodiments

Figure 11:
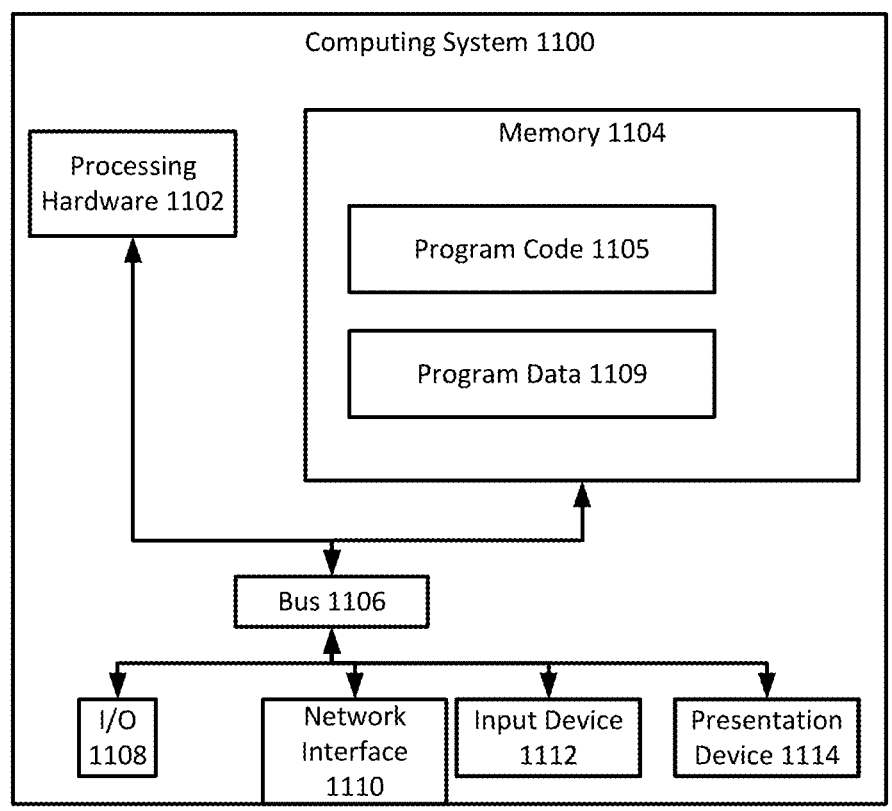
FIG. 11 illustrates an example of a computing system that can be used to implement certain embodiments.

Any suitable computing system or group of computing systems can be used for performing the operations described herein. For example, FIG. 11 depicts an example of a computing system 1100 that can be used to implement the graphics editing apparatus 112. In some aspects, the computing system 1100 includes processing hardware 1102 that executes program code 1105 (e.g., graphics editing tool 104), a memory device 1104 (e.g., the data storage unit 114) that stores one or more sets of program data 1109 computed or used by operations in the program code 1105 (e.g., graphics data 116), one or more input devices 1112, and one or more presentation devices 1114 for displaying graphical content generated by executing the program code 1105. For illustrative purposes, FIG. 11 depicts a single computing system on which the program code 1105 is executed, the program data 1109 is stored, and the input device 1112 and presentation device 1114 are present. But various applications, datasets, and devices described can be stored or included across different computing systems having devices similar to the devices depicted in FIG. 11.

The depicted example of a computing system 1100 includes processing hardware 1102 communicatively coupled to one or more memory devices 1104. The processing hardware 1102 executes computer-executable program code stored in a memory device 1104, accesses information stored in the memory device 1104, or both. Examples of the processing hardware 1102 include a microprocessor, an application-specific integrated circuit ("ASIC"), a field-programmable gate array ("FPGA"), or any other suitable processing device. The processing hardware 1102 can include any number of processing devices, including a single processing device.

The memory device 1104 includes any suitable non-transitory computer-readable medium for storing data, program code, or both. A computer-readable medium can include any electronic, optical, magnetic, or other storage device capable of providing a processor with computer-readable instructions or other program code 1105. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1105 may include processor-specific instructions generated by a compiler or an interpreter from code written in any suitable computer-programming language, including, for example, C, C++, C#, Visual Basic, Java, Python, Perl, JavaScript, and ActionScript.

The computing system 1100 may also include a number of external or internal devices, such as an input device 1112, a presentation device 1114, or other input or output devices. For example, the computing system 1100 is shown with one or more input/output ("I/O") interfaces 1108. An I/O interface 1108 can receive input from input devices or provide output to output devices. One or more buses 1106 are also included in the computing system 1100. The one or more buses 1106 communicatively couples one or more components of a respective one of the computing system 1100.

The computing system 1100 executes program code 1105 that configures the processing hardware 1102 to perform one or more of the operations described herein. The program code 1105 may be resident in the memory device 1104 or any suitable computer-readable medium and may be executed by the processing hardware 1102 or any other suitable processor. The program code 1105 uses or generates program data 1109. Examples of the program data 1109 include graphics data described above with respect to FIGS. 1-8.

In some aspects, the computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The computing system 1100 can communicate with one or more other computing devices via a data network using the network interface device 910.

An input device 1112 can include any device or group of devices suitable for receiving visual, auditory, or other suitable input that controls or affects the operations of the processing hardware 1102. Non-limiting examples of the input device 1112 include a recording device, a touchscreen, a mouse, a keyboard, a microphone, a video camera, a separate mobile computing device, etc. A presentation device 1114 can include any device or group of devices suitable for providing visual, auditory, or other suitable sensory output. Non-limiting examples of the presentation device 1114 include a touchscreen, a monitor, a separate mobile computing device, etc.

Although FIG. 11 depicts the input device 1112 and the presentation device 1114 as being local to the computing device that executes the program code 1105, other implementations are possible. For instance, in some aspects, one or more of the input device 1112 and the presentation device 1114 include (or are communicatively coupled to) a remote client-computing device that communicates with the computing system 1100 via the network interface device 1110 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing device for aligning one or more graphical elements, the method comprising:

identifying, for a target graphical element from a plurality of graphical elements, a position coordinate comprising one or more of a horizontal coordinate value and a vertical component value;

determining a number of clusters based on a validity score for the position coordinate and additional position coordinates for one or more additional graphical elements in the plurality of graphical elements;

grouping, by applying a clustering algorithm with the determined number of clusters, the position coordinate and one or more additional position coordinates for the one or more additional graphical elements into a cluster, wherein the one or more additional graphical elements are in the plurality of graphical elements;

selecting a centroid value of the cluster as an updated position value;

aligning the target graphical element with the one or more additional graphical elements by setting, to the updated position value, one or more of the horizontal coordinate value and the vertical component value in the position coordinate and one or more of the horizontal coordinate value and the vertical component value in the one or more additional position coordinates; and generating, for display on a display device, the plurality of graphical elements having the target graphical element aligned with the one or more additional graphical elements.

2. The method of claim 1, further comprising:

determining a number of rows of a grid by applying the clustering algorithm to a plurality of vertical component values of the plurality of graphical elements, respectively;

determining a number of columns of the grid by applying the clustering algorithm to a plurality of horizontal coordinate values of the plurality of graphical elements, respectively;

positioning the plurality of graphical elements within grid-cells, respectively, of the grid having the determined number of rows and the determined number of columns;

determining, based on a width and height of at least one graphical element of the plurality of graphical elements, a grid-cell height and a grid-cell width;

modifying sizes of at least some of the grid-cells to have the grid-cell height and the grid-cell width;

computing a spacing variable value indicating a space between two grid-cells; and modifying a spacing between at least some of the grid-cells based on the spacing variable value.

3. The method of claim 2, wherein determining the grid-cell height and the grid-cell width comprises:

identifying a maximum width from a set of widths of the plurality of graphical elements;

identifying a maximum height from a set of heights of the plurality of graphical elements;

setting the grid-cell width to the maximum width; and setting the grid-cell height to the maximum height.

4. The method of claim 2, wherein computing the spacing variable value comprises, for a dimension that is at least one of a horizontal dimension or a vertical dimension:

identifying (a) a number of clusters computed by the clustering algorithm for the dimension, (b) a maximum size of an area in the dimension in which the plurality of graphical elements is to be aligned, and (c) a grid-cell size, for each of the grid-cells in the dimension, that is at least one of the grid-cell height or the grid-cell width; and calculating, as the spacing variable value, a spacing between each pair of the grid-cells in the dimension such that the maximum size of the area in the dimension is equal to an arrangement of the grid-cells having the grid-cell size along the dimension and with the spacing.

5. The method of claim 1, wherein determining the number of clusters based on the validity score comprises:
setting the number of clusters for the clustering algorithm to a first cluster value;
computing a first value of the validity score for a first set of clusters generated by performing the clustering algorithm, with the first cluster value, on the position coordinate and the additional position coordinates;
setting the number of clusters for the clustering algorithm to a second cluster value;
computing a second value of the validity score for a second set of clusters generated by performing the clustering algorithm, with the second cluster value, on the position coordinate and the additional position coordinates; and
selecting the first cluster value as the determined number of clusters based on the first value of the validity score being greater than the second value of the validity score.

6. The method of claim 5, wherein computing the first value of the validity score for the first set of clusters comprises:
computing, based on the first cluster value and a Silhouette algorithm, the first value of the validity score.

7. The method of claim 6, wherein the Silhouette algorithm outputs a Silhouette score indicating, for a particular cluster in a set of clusters, a proximity between a point in the particular cluster and points in other clusters from the set of clusters.

8. A non-transitory computer-readable medium storing program code that, when executed by one or more processing devices, causes the one or more processing devices to perform operations comprising:
identifying, for a target graphical element from a plurality of graphical elements, a position coordinate comprising one or more of a horizontal coordinate value and a vertical component value;
grouping, by executing a clustering algorithm, the position coordinate and one or more additional position coordinates for one or more additional graphical elements into a cluster, wherein the one or more additional graphical elements are in the plurality of graphical elements;
selecting a centroid value of the cluster as an updated position value;
aligning the target graphical element with the one or more additional graphical elements by setting, to the updated position value, one or more of the horizontal coordinate value and the vertical component value in the position coordinate and one or more of the horizontal coordinate value and the vertical component value in the one or more additional position coordinates;
positioning the plurality of graphical elements within grid-cells, respectively, of a grid;
determining, based on a width and height of at least one graphical element of the plurality of graphical elements, a grid-cell height and a grid-cell width;
modifying sizes of the grid-cells to have the grid-cell height and the grid-cell width; and
generating, for display on a display device, the plurality of graphical elements positioned using the grid-cells having the grid-cell height and the grid-cell width, wherein the plurality of graphical elements, as generated for display, includes the target graphical element aligned with the one or more additional graphical elements.

9. The non-transitory computer-readable medium of claim 8, the operations further comprising:
determining a number of rows of the grid by applying the clustering algorithm to a plurality of vertical component values of the plurality of graphical elements, respectively;
determining a number of columns of the grid by applying the clustering algorithm to a plurality of horizontal coordinate values of the plurality of graphical elements, respectively;
computing a spacing variable value indicating a space between two grid-cells; and
modifying a spacing between at least some of the grid-cells based on the spacing variable value.

10. The non-transitory computer-readable medium of claim 9, wherein determining the grid-cell height and the grid-cell width comprises:
identifying a maximum width from a set of widths of the plurality of graphical elements;
identifying a maximum height from a set of heights of the plurality of graphical elements;
setting the grid-cell width to the maximum width; and
setting the grid-cell height to the maximum height.

11. The non-transitory computer-readable medium of claim 9, wherein computing the spacing variable value comprises, for a dimension that is at least one of a horizontal dimension or a vertical dimension:
identifying (a) a number of clusters computed by the clustering algorithm for the dimension, (b) a maximum size of an area in the dimension in which the plurality of graphical elements is to be aligned, and (c) a grid-cell size, for each of the grid-cells in the dimension, that is at least one of the grid-cell height or the grid-cell width; and
calculating, as the spacing variable value, a spacing between each pair of the grid-cells in the dimension such that the maximum size of the area in the dimension is equal to an arrangement of the grid-cells having the grid-cell size along the dimension and with the spacing.

12. The non-transitory computer-readable medium of claim 8, the operations further comprising determining a number of clusters based on a validity score for the position coordinate and the one or more additional position coordinates.

13. The non-transitory computer-readable medium of claim 12, wherein determining the number of clusters based on the validity score comprises:
setting the number of clusters for the clustering algorithm to a first cluster value;
computing a first value of the validity score for a first set of clusters generated by performing the clustering algorithm, with the first cluster value, on the position coordinate and the one or more additional position coordinates;
setting the number of clusters for the clustering algorithm to a second cluster value;
computing a second value of the validity score for a second set of clusters generated by performing the clustering algorithm, with the second cluster value, on the position coordinate and the one or more additional position coordinates; and selecting the first cluster value as the determined number of clusters based on the first value of the validity score being greater than the second value of the validity score.

14. The non-transitory computer-readable medium of claim 13, wherein computing the first value of the validity score for the first set of clusters comprises:
computing, based on the first cluster value and a Silhouette algorithm, the first value of the validity score.

15. The non-transitory computer-readable medium of claim 14, wherein the Silhouette algorithm outputs a Silhouette score indicating, for a particular cluster in a set of clusters, a proximity between a point in the particular cluster and points in other clusters from the set of clusters.

16. A computing system comprising:
a processing device communicatively coupled to a display device; and
a non-transitory computer-readable medium communicatively coupled to the processing device,
wherein the processing device is configured for executing instructions stored in the non-transitory computer-readable medium and thereby performing operations comprising:
identifying, for a target graphical element from a plurality of graphical elements, a position coordinate comprising one or more of a horizontal coordinate value and a vertical component value,
determining a number of clusters based on a validity score for the position coordinate and one or more additional position coordinates for one or more additional graphical elements in the plurality of graphical elements,
grouping, by applying a clustering algorithm with the determined number of clusters, the position coordinate and the one or more additional position coordinates for the one or more additional graphical elements into a cluster, wherein the one or more additional graphical elements are in the plurality of graphical elements,
selecting a centroid value of the cluster as an updated position value,
aligning the target graphical element with the one or more additional graphical elements by setting, to the updated position value, one or more of the horizontal coordinate value and the vertical component value in the position coordinate and one or more of the horizontal coordinate value and the vertical component value in the one or more additional position coordinates, and
configuring the display device to display the plurality of graphical elements having the target graphical element aligned with the one or more additional graphical elements.

17. The computing system of claim 16, the operations further comprising:
determining a number of rows of a grid by applying the clustering algorithm to a plurality of vertical component values of the plurality of graphical elements, respectively;
determining a number of columns of the grid by applying the clustering algorithm to a plurality of horizontal coordinate values of the plurality of graphical elements, respectively;
positioning the plurality of graphical elements within grid-cells, respectively, of the grid having the determined number of rows and the determined number of columns;
determining, based on a width and height of at least one graphical element of the plurality of graphical elements, a grid-cell height and a grid-cell width;
modifying sizes of at least some of the grid-cells to have the grid-cell height and the grid-cell width;
computing a spacing variable value indicating a space between two grid-cells; and
modifying a spacing between at least some of the grid-cells based on the spacing variable value.

18. The computing system of claim 17, wherein determining the grid-cell height and the grid-cell width comprises:
identifying a maximum width from a set of widths of the plurality of graphical elements;
identifying a maximum height from a set of heights of the plurality of graphical elements;
setting the grid-cell width to the maximum width; and
setting the grid-cell height to the maximum height.

19. The computing system of claim 17, wherein computing the spacing variable value comprises, for a dimension that is at least one of a horizontal dimension or a vertical dimension:
identifying (a) a number of clusters computed by the clustering algorithm for the dimension, (b) a maximum size of an area in the dimension in which the plurality of graphical elements is to be aligned, and (c) a grid-cell size, for each of the grid-cells in the dimension, that is at least one of the grid-cell height or the grid-cell width; and
calculating, as the spacing variable value, a spacing between each pair of the grid-cells in the dimension such that the maximum size of the area in the dimension is equal to an arrangement of the grid-cells having the grid-cell size along the dimension and with the spacing.

20. The computing system of claim 16, wherein determining the number of clusters based on the validity score comprises:
setting the number of clusters for the clustering algorithm to a first cluster value;
computing a first value of the validity score for a first set of clusters generated by performing the clustering algorithm, with the first cluster value, on the position coordinate and the one or more additional position coordinates, wherein;
setting the number of clusters for the clustering algorithm to a second cluster value;
computing a second value of the validity score for a second set of clusters generated by performing the clustering algorithm, with the second cluster value, on the position coordinate and the one or more additional position coordinates; and
selecting the first cluster value as the determined number of clusters based on the first value of the validity score being greater than the second value of the validity score.

* * * * *